United States Patent [19]

Keating et al.

[11] 4,119,940
[45] Oct. 10, 1978

[54] UNDERWATER VIEWING SYSTEM

[75] Inventors: Patrick N. Keating, West Bloomfield; Roger F. Koppelman, Livonia; Takeo Sawatari, Southfield, all of Mich.

[73] Assignee: The Bendix Corporation, North Hollywood, Calif.

[21] Appl. No.: 733,509

[22] Filed: Oct. 18, 1976

[51] Int. Cl.² .............................................. G01S 9/66
[52] U.S. Cl. .................................................. 340/5 H
[58] Field of Search ........................... 340/5 MP, 5 H

[56] References Cited

U.S. PATENT DOCUMENTS

| | | | |
|---|---|---|---|
| 3,771,116 | 11/1973 | Farrah ................................. | 340/5 H |
| 3,942,150 | 3/1976 | Booth et al. ......................... | 340/5 H |

Primary Examiner—Richard A. Farley
Attorney, Agent, or Firm—Robert C. Smith; William F. Thornton

[57] ABSTRACT

An underwater viewing system described herein substantially reduces the number of hydrophones in the receiving array and associated circuitry by providing a plurality of transmitting transducers spaced apart by a known distance, each emitting a coded output which is normally a separate frequency. The receiving array, which is preferably square or rectangular, includes a substantial number of receiving hydrophones.

A synthetic aperture technique is applied in which the reflected signal arriving at each individual hydrophone is amplified, modulated with a lower frequency reference signal, filtered, digitized and stored in a memory, preferably as part of a computer. The computer also compares each digitized hydrophone signal against sine and cosine reference signals at each frequency and performs a Fourier analysis of each row and column to reconstruct a primary image. It also computes spatial modulation through complex multiplication, addition and subtraction and, through this, reconstructs adjacent images for each transducer frequency such that the ultimate image synthesized and displayed is one in which the effective number of image points is like that of a system in which the number of hydrophones is the actual number multiplied by the number of different transmitted frequencies.

6 Claims, 4 Drawing Figures

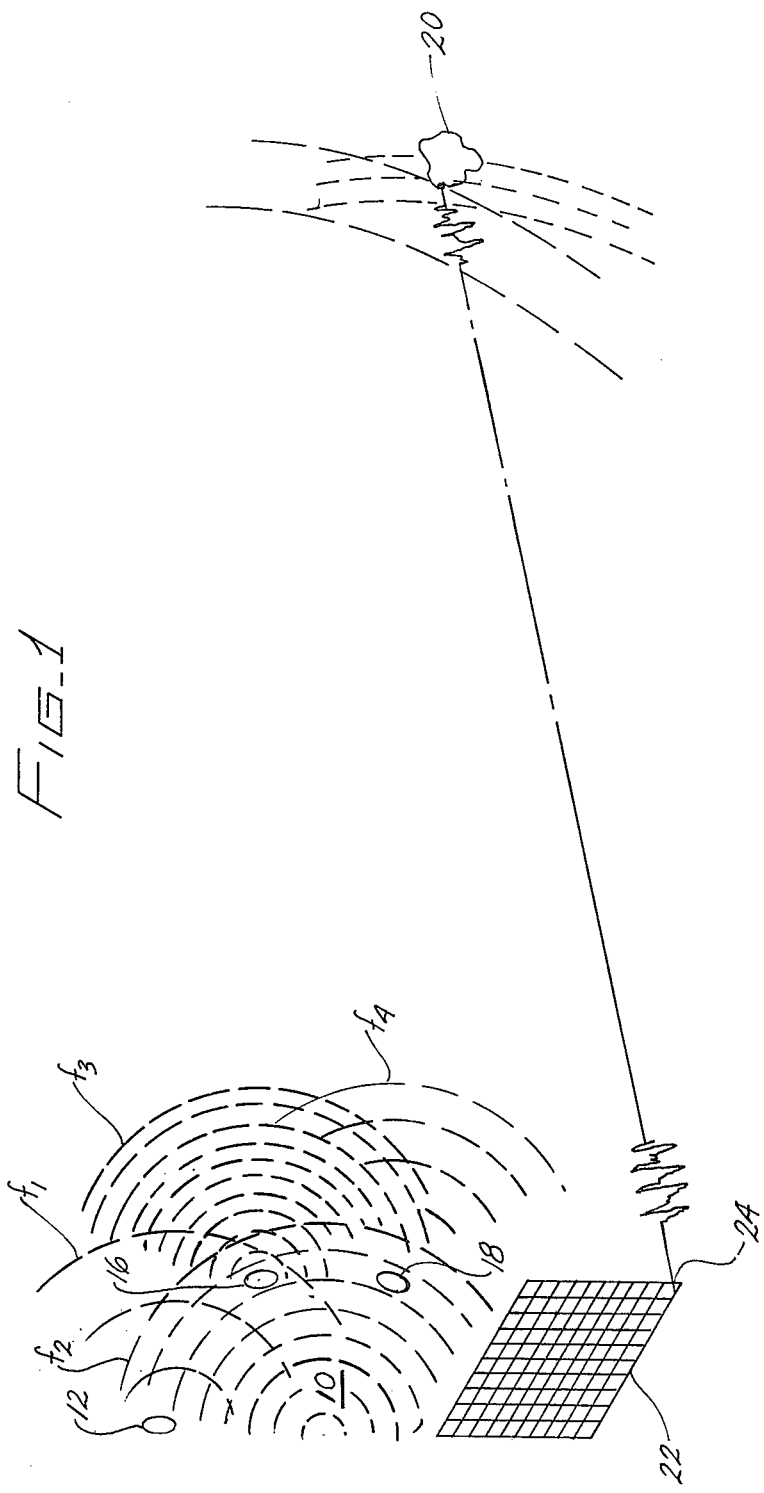
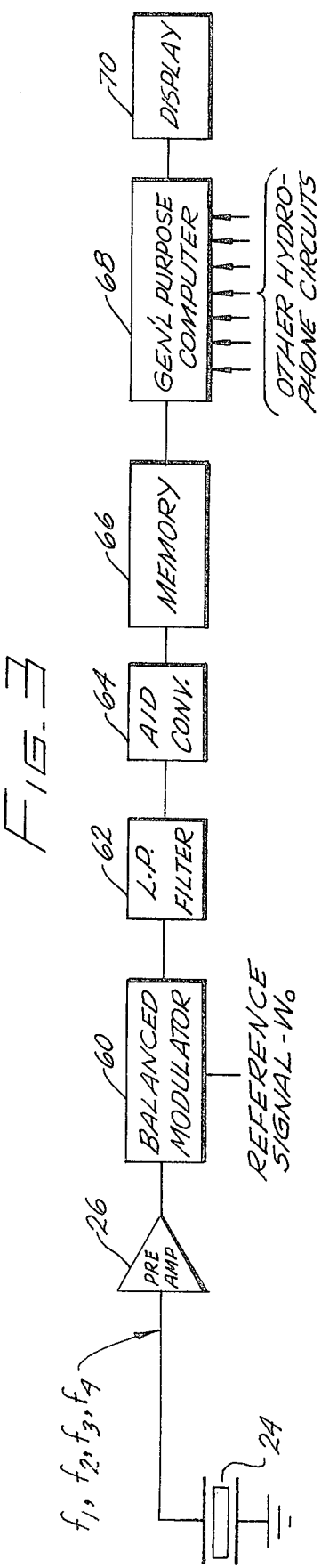

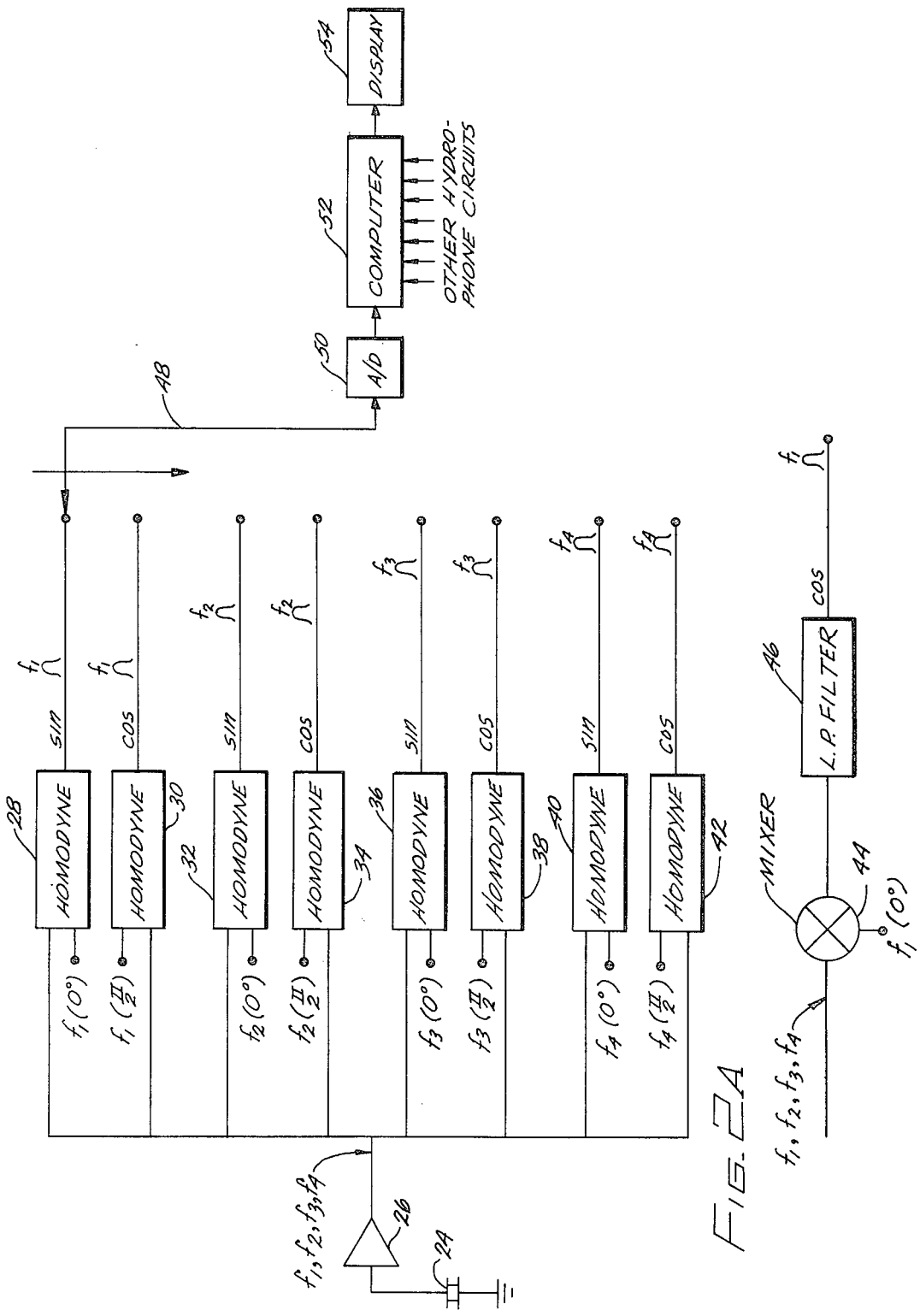

4,119,940

UNDERWATER VIEWING SYSTEM

The invention described herein was made in the course of or under a contract with the Navy Department.

BACKGROUND OF THE INVENTION

There has been a considerable amount of work done in the past several years on systems applying holography to acoustic underwater viewing and sonar. One straightforward way of accomplishing this function is to provide a system including a transducer or transducers transmitting a single frequency and a large areal hydrophone receiving array. A volume of water is insonified by means of a transmitting transducer or transducers, and objects in this volume reflect this energy which is received at the receiving array. Each receiving array includes a sufficiently large number of receiving hydrophones to adequately sample the returning pressure wavefront. Each of these receiving hydrophones provides a signal representing a signal strength and phase of the sonar signal sensed at its location, the combined signals then being each homodyned or compared (through multiplication) with sine and cosine reference signals at the transmitted frequency. The resulting signals are then filtered in a low pass filter to provide d.c. levels representing a set of complex numbers which describe the signal strength and relative phase of the pressure field detected by the receiving hydrophone. This same action takes place in an input circuit for each of the separate individual receiving hydrophones. The d.c. outputs from all the homodyne circuits are then sequentially switched into an analog-to-digital converter and stored in a computer. The function of the computer, among other things, is to (1) provide two-dimensional focusing and (2) provide a two-dimensional fast Fourier transform analysis which provides the image. It then outputs the image to a display device such as a cathode ray tube.

While the above described arrangement is quite operative, the amount of equipment required for such a system increases linearly with increases in the number of receiver elements. Even when the number of receiving elements becomes quite large, such as a square array with 32 hydrophones on a side giving a total of 1024 separate contributions to the overall image, the resolution for many purposes is not adequate, and it would be desirable to have more. It will be recognized that, with the arrangement described above, such a system with all of the hardware required for the separate homodyne circuits involving each individual receiving element and the complexity of the switching circuitry would be extremely cumbersome. Thus, there is a need for a system having even more imaging points for higher resolution while at the same time reducing the amount of hardware required for the system.

DESCRIPTION OF THE DRAWINGS

FIG. 1 is a schematic diagram of the trasmitter and receiver arrangements of our underwater viewing system;

FIG. 2 is a schematic block diagram of a first embodiment of our invention including an arrangement for processing signals received at a single hydrophone and for combining said signals for display; and FIG. 2A is a simplified block diagram of a single homodyne unit of the type used in the system of FIG. 2.

FIG. 3 is a schematic block diagram of a second embodiment of our invention including an arrangement for processing signals received at a single hydrophone and for combining said signals for display.

DESCRIPTION OF THE PREFERRED EMBODIMENTS

Referring now to FIG. 1, a transmitting array is shown generally at numeral 10 including four hydrophones 12, 14, 16 and 18, each of which preferably transmits sonar waves at a different frequency, such as frequencies $f_1$, $f_2$, $f_3$ and $f_4$. These frequencies are normally transmitted in parallel such that they insonify a volume of water including an object 20. The wave fronts from each of the transmitting transducers 12, 14, 16 and 18 are essentially spherical and impinge on the object 20 at many locations and, because of the physical displacement of the transducers from each other, from different angles. If an exemplary point 20a is selected on object 20, it will be observed that all four sets of waves will impinge on this point. They will also be reflected from this point in the form of a complex sonar wave which is, at any given instant, an algebraic addition of the waves striking and reflecting from point 20a. This complex reflected wave carrying both phase and amplitude information is reflected in many directions and particularly toward a receiving array 22 containing a substantial number of individual hydrophones which, for convenience, is shown as a 10×10 array having 100 hydrophones. Each such hydrophone will receive a complex wave not only from point 20a but from many other reflecting points on object 20. It is most convenient to consider the present system in terms of what happens to the echo signal arriving at a single hydrophone and then to remember that similar signals will be arriving at all the other hydrophones, differing in amplitude and phase because of the different relative positions of the transmitting and receiving hydrophones and the different positions of the reflecting points.

There are many combinations of transmitting and receiving arrays which might be used, the number selected herein being chosen primarily because it explains the invention without introducing the complexity which might accompany description of a system having a substantially greater number of transmitter transducers and receiving hydrophones. With the 10×10 array and four transmitting hydrophones, the system synthesizes a 20×20 receiving array with 800 separate image points, since when complex data sampling (sine and cosine) is used, the number of image points which can be realized when using an N × M array is equal to 2N × M. One arrangement which has been determined to provide satisfactory resolution incorporates nine transmitting transducers with nine different frequencies and a 32×32 receiver array which, with the techniques taught herein, would synthesize a 96×96 array with 18432 separate image points. Greater numbers of hydrophones and transmitting transducers would, of course, further increase the resolution of the system, but at correspondingly greater expense and complexity in implementation. Also, while separate frequencies are described for each transmitting transducer, it is recognized that different modulating signals on single carrier or a plurality of carriers may also be used. This would also introduce some additional complexity in demodulation.

FIG. 2 is a block diagram of a first embodiment of a processing unit for a single receiving hydrophone. The reflected signal ($f_1$, $f_2$, $f_3$, $f_4$) is received on hydrophone 24 which converts the acoustic signal to a complex electrical wave of the same characteristics as the received acoustic wave. This signal is then amplified in a preamplifier 26 and supplied to a plurality of homodyne units 28, 30, 32, 34, 36, 38, 40 and 42. Each homodyne unit receives either a sine (0°) or cosine ($\pi/2$) reference signal at one of the transmitted frequencies. A simplified block diagram of a homodyne unit is shown in FIG. 2A, and it will be seen that it includes a mixer 44 which receives all of frequencies $f_1$, $f_2$, $f_3$ and $f_4$ received at the hydrophone 24 plus a reference frequency signal which is either the sine or cosine signal at one of the transmitted frequencies, in this case $f_1$ (0°). All of the various resulting sum and difference frequency signals are blocked by the low pass filter 46, except the slowly varying (or d.c.) signal representing $f_1 \cdot f_1$ (0°). Each of the other homodyne circuits operates in the same manner providing quadrature signals representative of each of the input frequencies.

The various output signals of the homodyne circuits are sequentially switched by means of a switching device 48 to an analog-to-digital converter 50 which converts the respective signals to digital signals and supplies them to a computer 52 which includes memory means for accepting and storing the several digital signals originating with hydrophone 24 as well as similar signals from the 99 other hydrophones. The computer must thus store and process 800 separate digital signals, each of which contains phase and amplitude information describing the signal contributions due to each of the four different frequencies as received at each of the 100 hydrophones. Reconstruction of the image in the computer is accomplished by first phase-shifting the data to provide two-dimensional focusing and then performing a 40-point Fourier transform analysis of first one row of 10×2 (sine and cosine) data, then the next row, and so on through ten rows. A 40-point Fourier transform is then carried out for each of the ten columns. As a result of this reconstruction process, a 40×40 complex set of image data is formed representative of the view as seen by the receiving array in response to one frequency such as $f_1$ emanating from transducer 12.

Although a set of 10×10 complex data points is sufficient to only generate a 20×20 complex set of image points, the contributions from this set, when combined with the contributions from the other three sets (resulting from the receiving array's response to frequencies $f_2$, $f_3$ and $f_4$), are sufficient to generate a 40×40 complex set of image points.

It has been shown that, if either the set of complex data representing the detected pressure field or the set of complex data representing the image reconstructed from the pressure field are subjected to spatial modulation (through complex multiplication, addition and subtraction), the apparent location of transmitting transducer 16, for example, can be made to coincide with that occupied by transducer 12. More importantly, the detected pressure information resulting from the reflection of the signal originating at transducer 16 by object 20 will also appear to be the result of a transmitting transducer located at the position occupied by transducer 12. Therefore, all sets of data subsequent to the first data set not only undergo two-dimensional focusing and Fourier transform analysis identical to that previously described, but also undergo spatial modulation as described above after which the resulting data set is added to previous image information contributions.

If the final image is assembled from images formed from each set of data, then the necessary spatial modulation and phase shift is given by $$F(x,y) = \sum_n \left[ f_n(x,y) \exp\left(-\frac{i\pi}{\lambda R}(d_{nx} + d_{ny})\right) \exp\left(\frac{2\pi i}{\lambda R}(xd_{nx} + yd_{ny})\right) \right],$$

where $f_n(x,y)$ is the two-dimensional image data from the $n^{th}$ transmitter, and $d_{nx}$ and $d_{ny}$ are the $x$- and $y$-components of the position of the $n^{th}$ transmitter in the plane of the array relative to the center of the image ($x=y=0$). The parameter $\lambda$ is the radiation wavelength, and R is the range of the object plane.

On the other hand, the final image may be obtained from the holographic data using spatial modulation defined by $$F(x,y) = \int du \int dv \sum_n g_n(u-d_x, v-d_y) \exp\left(-\frac{i\pi}{\lambda R}[(u-x)^2 + (v-y)^2]\right),$$

where $g_n(u,v)$ is the two-dimensional hologram data from the $n^{th}$ transmitter. These formulae are given for continuous distributions $g_n(u,v)$; the minor modifications necessary for discretely-sampled distributions will be obvious to one skilled in the art.

The final result, when all such contributions have been added, is a set of image information which appears to be from a system which has one transmitting transducer located at the position occupied by transducer 12 and which has an apparent array size of 20×20 elements.

One additional factor which must be considered in a practical system is that the above is based on the knowledge that the transmitting transducers have an exact, known spacing and phase shift. However, due to mechanical tolerances this may or may not be true; therefore, a calibration of the system must be performed where object 20 is replaced by a reflector sufficiently small so as to appear to be a point reflector for all transmitting transducers included in the system. The image location resulting from the reflections from this point reflector of pressure wave fronts emanating from the various transmitting transducers is compared to that which would result if the transmitting transducers were ideally spaced and any discrepancies noted. These discrepancies in positional placement of the transmitting transducers can then be corrected for by modifying the amount of spatial modulation applied to each of the image data subsets as described above. This calibration procedure need only be performed on an infrequent periodical basis to compensate for additional changes in the location due to mechanical vibrations, etc.

Once the complex sets of image information have been combined in the above manner, the complex data representing each image point and consisting of a "real" part (cosine) and an "imaginary" part (sine) undergo an additional operation where the "real" part is squared and added to the square of the imaginary part, thereby forming the image intensity information required for display. This information is then supplied to a display device 54 which may be a cathode ray tube.

The spacing of the transmitting transducers is most conveniently arranged such that the distance from transducer 12 to transducer 16 or transducer 14 is equal to the length of the receiver array on one side. Although other arrangements can be used, the result of a smaller spacing would be a smaller synthesized array which is partially oversampled, while a large spacing would result in a larger synthesized array which is partially undersampled. Although this type of transducer spacing may be useful for special applications, the foregoing method of aperture synthesis would be modified to account for the particular transmitting transducer arrangement.

The above described system might be considered as essentially a "hardware" embodiment of our system since separate homodyne circuits are supplied for each of the several signals processed from each hydrophone. When a more typical array of 32×32 receiving hydrophones is used, this results in a very large amount of circuitry to accomplish the homodyning function. In FIG. 3 a second embodiment is shown in which this function is dealt with in the computer. The hydrophone 24 receives the signals $f_1, f_2, f_3$ and $f_4$ as before and converts the acoustic signals to electrical signals which are amplified in a preamplifier 26 and are then supplied to a balanced modulator 60 where the complex wave is heterodyned against a reference signal $W_o$ which is at a lower frequency than any of the transmitted frequencies. The results in sum and difference frequencies of which the sum frequencies and noise are filtered out in a low pass filter 62. The resulting low frequency signal is then sampled at or above the Nyquist rate, digitized using an analog-to-digital converter 64, and stored in a memory 66. Converter 64 may be a sampling type, or there may be separate "sample and hold" means. The memory 66 thus stores digital information representing all of the frequencies received at hydrophone 24, and this information is then sequentially fed into a general purpose computer 68 which also receives the stored digital signals from each of the 99 other hydrophone circuits. In the computer 68 the homodyne function described above is performed with sine and cosine reference signals to separate the frequency contributions of each input signal. In addition, the other computer functions described above are performed including the two-dimensional focusing and the Fourier transform reconstruction of the basic or reference image and the reconstruction of the 40×40 image as described above. In the course of the reconstruction the computer must also supply spatial modulation to the data to take into account (1) the geometrical relationship between the transmitting transducers and (2) any misalignment of the transmitter transducers. The output of the computer 68 is then displayed on the display device 70 which may be and is, preferably, a cathode ray tube.

While the invention has been described in terms of square arrangements of receiving hydrophones and transmitting transducers, it will be apparent that other arrangements are possible. For example, applicant's assignor has done some work with a rectangular receiving array and only two transmitting transducers which were used to provide a synthesized image with double the image points of the receiver array. Also, as suggested above, the outputs of the transmitting transducers may be of the same frequency with different modulation on each, or may involve some other frequency type of signal coding scheme which is readily decoded in a computer, but such coding scheme should preserve phase information of the various input signals. And while the system as described above contemplates performing the spatial modulation subsequent to the Fourier transform analysis, it could also be performed ahead of the Fourier transform analysis.

We claim:

1. An underwater viewing system including transmitting transducer means for insonifying a volume of water,
   a large areal receiving array having a large number of hydrophones for receiving sonar reflections from objects in said volume of water,
   analog-to-digital converter means,
   means connecting the received signals to said analog-to-digital converter means,
   means for performing two-dimensional focusing and a two-dimensional Fourier analysis on said digitized signals and for reconstructing an image as it appears at said array, and
   display means connected to said image reconstructing means for displaying said image;
   characterized in that said transmitting transducer means includes a plurality of separate transducers spaced a significant distance apart, each of which emits a coded output signal having frequency characteristics different from the others,
   homodyne means are included for comparing each hydrophone input signal with sine and cosine reference signals at each of the transmitted frequencies for separating the frequency contributions at each hydrophone including phase information for each frequency,
   said image reconstructing means including means providing spatial modulation to account for spatial separation of the transmitters and to facilitate calibration and means combining the resultant data sets to form a synthesized data set whose resolution is commensurate with an array whose number of hydrophones is that in said actual receiving array multiplied by the number of transducers in said transmitting transducer means.

2. An underwater viewing system as set forth in claim 1 wherein each of said transmitting transducers emits a frequency different from the others.

3. An underwater viewing system as set forth in claim 1 in which said spatial modulation is provided by means effecting complex multiplication, addition and subtraction.

4. An underwater viewing system as set forth in claim 1 in which said receiving array comprises a square array of hydrophones and said transmitting transducers are also equally spaced in a square array with the spacing between any two of said transducers along the sides of the transmitting array being essentially equal to the length of the sides of said receiver array.

5. An underwater viewing system as set forth in claim 1 in which said receiving array is a rectangular array of hydrophones and said transmitting array includes a plurality of transmitting transducers spaced apart at least by the length of the shortest side of said rectangular array.

6. In an underwater receiving system including transmitting transducer means for insonifying a volume of water,
   a large areal receiving array having a large number of hydrophones for receiving sonar reflections from objects in said volume of water,
   analog-to-digital converter means, means connecting the received signals to said analog-to-digital converter means, means for performing two-dimensional focusing and a two-dimensional Fourier analysis on said digitized signals and for reconstructing an image as it appears at said array, and display means connected to said image reconstructing means for displaying said image;

a method of synthesizing an image having a substantially greater number of image points than is represented by the number of hydrophones in said receiving array, comprising providing in said transmitting transducer means a plurality of separate transducers each of which emits a coded output signal having frequency characteristics different from the others, comparing said hydrophone input signals with sine and cosine reference signals at each of the transmitted frequencies for separating the frequency contributions at each hydrophone including phase information at each frequency, and reconstructing the image as it appears at said receiving array comprising providing in connection with said Fourier analysis means spatial modulation to account for spatial separation of said transducers and to facilitate calibration, and combining the resultant data sets to form a synthesized data set whose resolution is commensurate with an array whose number of receiving hydrophones is equal to the number of hydrophones in said actual receiving array multiplied by the number of transducers in said transmitting transducer means.

* * * * *